Patented Mar. 20, 1928.

1,663,436

UNITED STATES PATENT OFFICE.

ERNEST R. BRIDGWATER, OF WILMINGTON, DELAWARE, ASSIGNOR TO E. I. DU PONT DE NEMOURS & COMPANY, OF WILMINGTON, DELAWARE, A CORPORATION OF DELAWARE.

COLORED VULCANIZED RUBBER AND PROCESS OF MAKING THE SAME.

No Drawing. Application filed January 29, 1926. Serial No. 84,783.

This invention relates to the coloring of rubber, particularly in orange and red shades.

One object of my invention is to provide a coloring matter for rubber which can be used in relatively small proportions to produce a very brightly colored rubber.

Another object of my invention is to provide a coloring matter for rubber which will have no tendency to retard the vulcanization thereof, and which will have no other deleterious effect on the quality of the rubber compound.

It has been known for several years that the lakes made from the heavy metal salts of the compound produced by coupling diazotized 2-chlor-5-toluidine-4-sulfonic acid with beta-naphthol could be used for coloring rubber which was vulcanized by heat. These heavy metal lakes produce a fairly satisfactory color in rubber but must be used in relatively large amounts, in order to produce a certain brightness of color. I have now discovered that the alkali-metal salts of the compound produced by coupling diazotized 2-chlor-5-toluidine-4-sulfonic acid with beta-naphthol produces brighter colored rubber than the previously known compounds. Rubber containing colors of this group is not subject to bleeding or blooming of the color and retains its brightness and desirable physical properties very well during storage and in service. The alkali-metal salts of the compound produced by coupling diazotized 2-chlor-6-toluidine-4-sulfonic acid with beta-naphthol have similar properties and produce similar results in rubber compounds.

The following is an example of the use in rubber of the sodium salt of diazotized 2-chlor-5-toluidine-4-sulfonic acid coupled with beta-naphthol:

| | Parts. |
|---|---|
| Pale crepe rubber | 100 |
| Zinc oxide | 3 |
| Sulfur | 2.5 |
| Di-ortho-tolylguanidine | 0.5 |
| Sodium salt of diazotized 2-chlor-5-toluidine-4-sulfonic acid plus beta-naphthol | 0.5 |

This compound should be vulcanized for 40 minutes at 40 pounds steam pressure. Any other organic accelerator which does not produce dark colored rubber, such as diphenyl-guanidine, hexamethylenetetramine, etc. may be used. This rubber compound will have a bright orange-red color after vulcanization which is not seriously affected by storage or exposure to the elements.

The organic component of the new rubber color derived from 2-chloro-5-toluidine-4-sulfonic acid has most probably the structure shown in the following graphical formula:

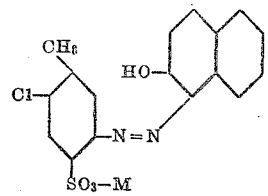

where M represents an alkali-metal such as sodium.

Although in the above example I have given detailed proportions of the ingredients of a rubber mix in which the new color is incorporated, it will be understood that said example is merely illustrative, and that the proportions of the several ingredients may vary to a certain extent without departing from my invention.

I claim:

1. The process of coloring rubber which comprises mixing rubber or rubber-like materials with a vulcanizing agent and with the sodium salt of the azo compound obtainable by coupling diazotized 2-chloro-5-toluidine-4-sulfonic acid with beta-naphthol.

2. A colored vulcanized rubber obtainable by mixing rubber or a rubber-like material with an azo sodium sulfonate having the following graphical formula:

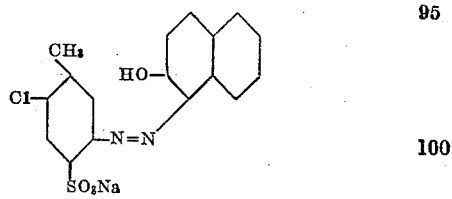

and with a vulcanizing agent, and other compounding ingredients and fillers, and vulcanizing the mixture.

3. A vulcanized rubber product having a color ranging from red to orange-red, and characterized by containing a coloring matter having the following general formula:
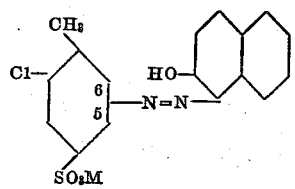
where the azo group is attached to the 5 or 6 position of the benzene ring, and where M represents an alkali-metal.
In testimony whereof I affix my signature.
ERNEST R. BRIDGWATER.